(12) United States Patent
Lyders et al.

(10) Patent No.: US 7,438,524 B2
(45) Date of Patent: Oct. 21, 2008

(54) WINGED STRUCTURAL JOINT AND ARTICLES EMPLOYING THE JOINT

(75) Inventors: David R. Lyders, Middletown, CT (US); C. Brian Klinetob, Manchester, CT (US); James T. Roach, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 660 days.

(21) Appl. No.: 11/185,493

(22) Filed: Jul. 20, 2005

(65) Prior Publication Data

US 2007/0018048 A1   Jan. 25, 2007

(51) Int. Cl.
*F01D 25/28* (2006.01)
(52) U.S. Cl. ................................. 415/200; 415/213.1

(58) Field of Classification Search .................. 415/142
See application file for complete search history.

(56) References Cited

U.S. PATENT DOCUMENTS 5,525,035 A * 6/1996 Ben-Porat et al. ........... 415/200

* cited by examiner

*Primary Examiner*—Richard Edgar
(74) *Attorney, Agent, or Firm*—Carlson, Gaskey & Olds

(57) ABSTRACT

A structural joint includes inner preforms 20, 22 and outer preforms 24, 26 of material. The outer preform has legs 38, 40 that extend longitudinally and laterally from a fold 42. The inner preforms project longitudinally past the fold to define a spar 44. A wing, such as wings 50, 52, 54, 56, extends from the spar. The spar and wing cooperate with a substructure to resist separation of the spar and wing from the substructure. The joint is described in the context of a duct, such as a turbine engine inlet duct, but may be used in other applications.

21 Claims, 3 Drawing Sheets

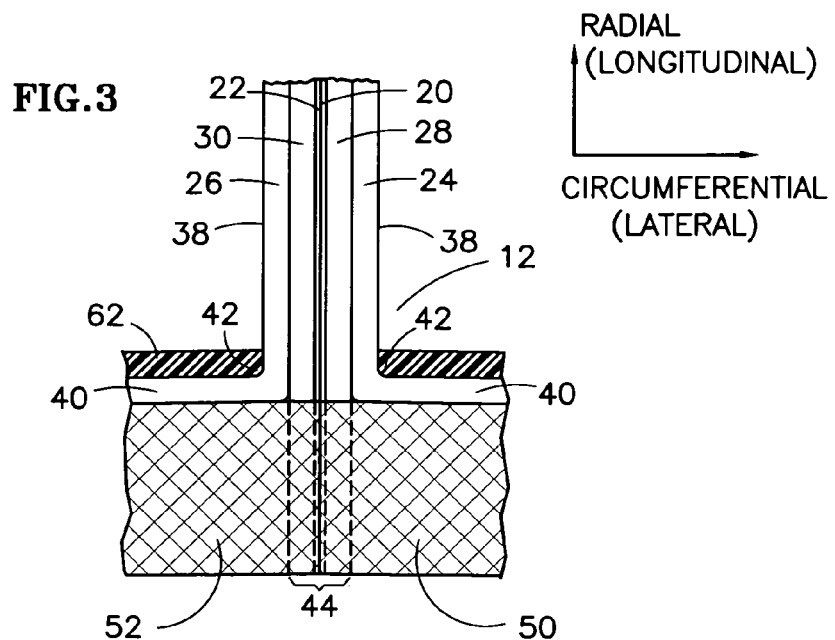
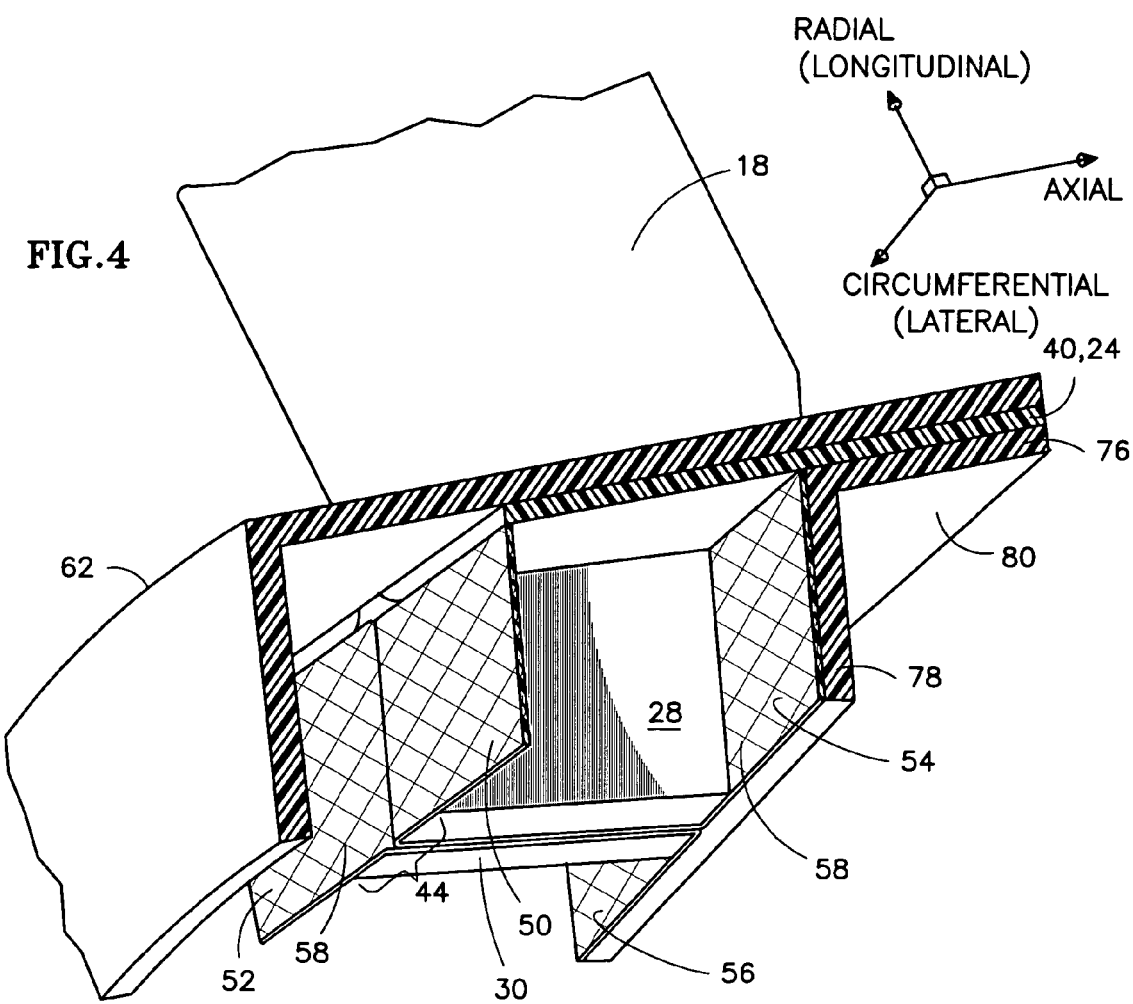

WINGED STRUCTURAL JOINT AND ARTICLES EMPLOYING THE JOINT

STATEMENT OF GOVERNMENT INTEREST

This invention was made under U.S. Government Contract N00019-02-C-3003. The Government has certain rights in the invention.

TECHNICAL FIELD

This invention relates to an improved structural joint that is especially useful for joining components made of composite materials. The joint is described in the context of a turbine engine inlet case or similar duct.

BACKGROUND

Turbine engines, such as those used to power aircraft, may include an inlet case for guiding a stream of working medium fluid into the engine. The case includes radially inner and outer walls both circumscribing an engine axis to define an annular gaspath. Struts span radially across the gaspath to connect the walls to each other. The interface between each strut and the adjoining wall and substructure must have the capacity to withstand appreciable structural loads.

Some engines employ a multifunctional strut whose surface is aerodynamically contoured so that the strut satisfies both structural and aerodynamic requirements. Alternatively, a designer may find it necessary or desirable to employ a dedicated structural strut enveloped by an aerodynamically contoured shell that has little structural value. If the designer is also required to package the dedicated structural strut and its shell in the same volume of space that would have been occupied by the multifunctional strut, the structural strut will be smaller than the multifunctional strut. This can compromise the strength of the interface or joint between the strut and the wall and substructure, particularly when the case is made of preforms comprising plies of composite materials.

SUMMARY

In one embodiment of the joint, an outer preform includes legs extending longitudinally and laterally from a fold. An inner preform projects longitudinally past the fold to define a spar. The spar includes a wing angularly offset from the spar. The spar and wing cooperate with a substructure to resist separation of spar and wing from the substructure.

The foregoing and other noteworthy features of the joint will become more apparent from the following detailed description and the accompanying drawings.

BRIEF DESCRIPTION OF THE DRAWINGS

FIG. 3 is a view in the direction 3-3 of FIG. 1.

FIG. 4 is a perspective view showing selected features of the case of FIG. 1.

DETAILED DESCRIPTION

Figure 1:
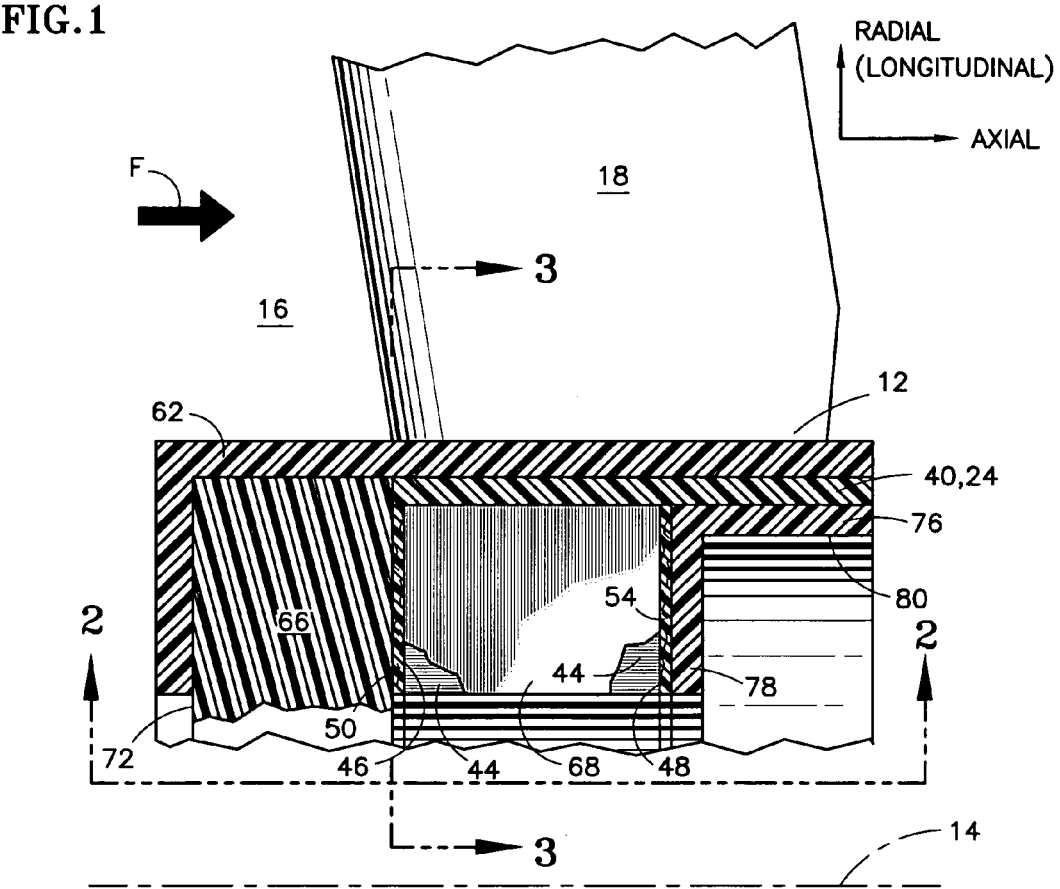
FIG. 1 is a side elevation view of a portion of a turbine engine inlet case showing a case wall and a strut, both made of preforms of a composite material and also showing components of a case substructure.
Figure 2:
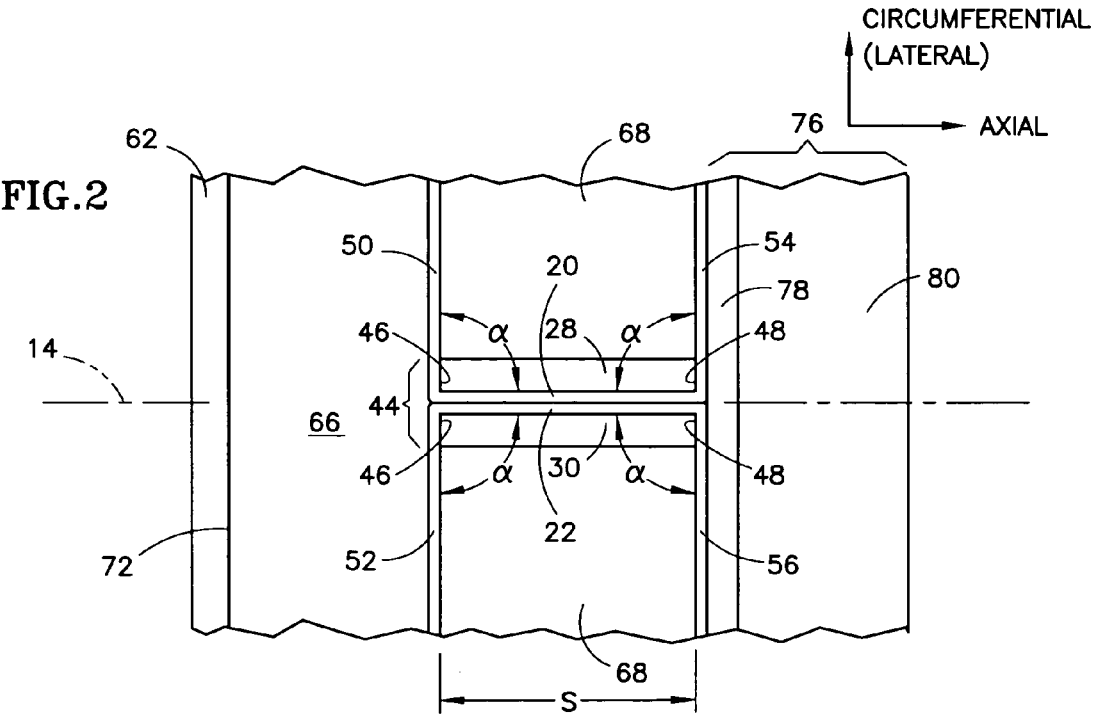
FIG. 2 is a view in the direction 2-2 of FIG. 1.

FIGS. 1-4 show a portion of a fan inlet case for a turbine engine. The figures also show a coordinate system with axial, radial and circumferential directional components since such a system is a natural choice when describing turbine engines. However in other applications, including those not involving cases or ducts, a more general coordinate system employing longitudinal and lateral directional components may be more appropriate. As seen in the illustrations, the longitudinal direction corresponds to the radial direction and the lateral direction, which extends sideways from the longitudinal direction, corresponds to the circumferential direction.

The inlet case includes a radially inner wall 12 and a radially outer wall (not shown) both circumscribing an engine axis 14. The walls define the radially inner and outer extremities of an annular flowpath 16 for guiding a stream of working medium fluid F axially into the engine. A set of circumferentially (laterally) distributed struts 18 span radially (longitudinally) across the flowpath.

The inlet case, which includes the walls and struts, is made of laminate preforms comprising one or more layers or plies of a composite material. An example composite material is a graphite fabric embedded in a cured resin.

As seen best in FIG. 3, the strut includes laterally inner preforms 20, 22, laterally outer preforms 24, 26 and optional intermediate preforms 28, 30 residing laterally between the inner and outer preforms.

Each outer preform 24, 26 has legs 38, 40 extending longitudinally and laterally respectively from a fold 42 in the outer preform. The fold extends substantially axially because the strut is oriented approximately parallel to axis 14. However the strut and/or fold may be oriented obliquely relative to the axis. The inner preforms 22, 24 and the optional intermediate preforms 28, 30 project longitudinally past the fold to define a spar 44. The projecting portions of the inner preforms 20, 22 are axially oversized relative to the finished axial dimension S (FIG. 2) of the spar. During fabrication, forward creases 46 are formed so that the oversized portion defines forward wings 50, 52 that extend from the spar in laterally opposite directions. In the illustrated embodiment, aft creases 48 are also formed to define aft wings 54, 56 that extend from the spar in laterally opposite directions. The wings are angularly offset from the spar by an angle $\alpha$ of about ninety degrees.

The portions of the optional intermediate preforms 28, 30 that project longitudinally past the lateral legs 40 could also be creased to define additional wings. However in the illustrated construction, the projecting portions of the intermediate preforms are devoid of any wings.

As seen in FIG. 4, The fibers 58 comprising the inner preforms 20, 22 are "off-angle" fibers oriented obliquely i.e. neither parallel nor perpendicular to the creases 46, 48. Preferably, the fibers are oriented at 45 degrees relative to the crease to ensure optimum strength.

Figure 5A:
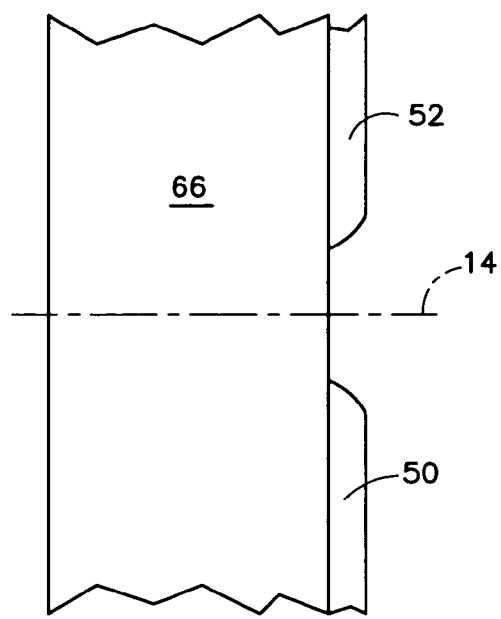
FIGS. 5A, 5B and 5C are views in direction 2-2 of FIG. 1 but circumferentially offset from FIG. 2 to show the relationship between wings extending laterally from neighboring spars.
Figure 5B:
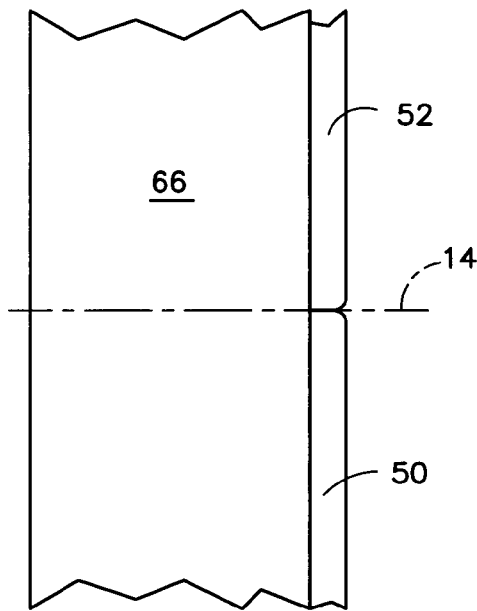
Figure 5C:
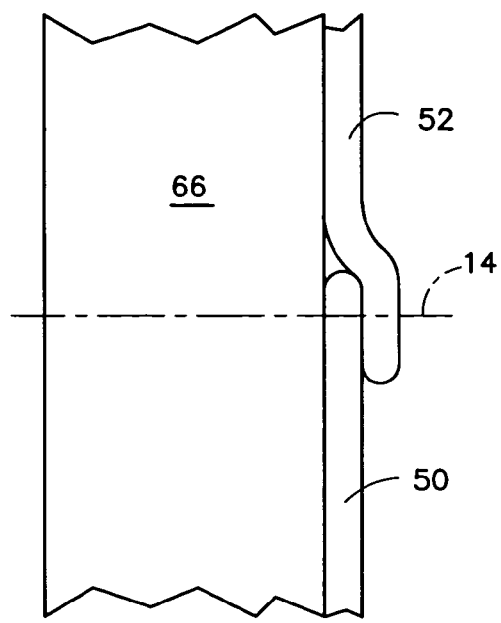

Referring now to FIGS. 5A, 5B, and 5C, the forward wings 50 extend laterally toward a companion wing 52 associated with a neighboring strut. As seen in FIG. 5A, the wings need not reach across the entire lateral or circumferential distance between the struts. The wings may abut each other as seen in FIG. 5B, or may overlap each other as seen in FIG. 5C. These options are also applicable to the aft wings 54, 56.

Referring again to FIGS. 1, 3 and 4, a cover preform 62, covers each laterally extending leg 40 of the strut outer preforms 24, 26. The cover preform extends from each strut 18 to its circumferentially adjacent neighboring struts.

The inlet case also includes a substructure whose components include a circumferentially continuous prefabricated composite forward ring 66, a circumferentially continuous prefabricated composite aft ring 76, and a set of discrete, circumferentially distributed prefabricated composite inserts 68, all of which are described in more detail in the succeeding paragraphs.

The forward ring 66 borders the forward face of the forward wings 50, 52. The inserts 68 border the opposite face of each forward wing so that each wing 50, 52 nests between the ring 66 and an insert 68. Each insert extends circumferentially from a spar 44 to a circumferentially neighboring spar. The cover preform 62 wraps over forward face 72 of the forward ring 66.

As seen best in FIGS. 1 and 4, the aft ring 76 includes a base portion 78 and an axial extension 80. The base 78 borders the aft face of aft wings 54, 56. The extension 80 extends axially aft of the base and cooperates with the cover preform 62 and the lateral legs 40 of the outer preforms 24, 26 to define an aft portion of wall 12. The inserts 68 border the forward face of the aft wings 54, 56 so that each wing 54, 56 nests between an insert 68 and the aft ring 76. The inserts occupy the space between the forward wings 50, 52 and their counterpart aft wings 54, 56.

During fabrication of the inlet case, the various composite preforms and prefabricated components of the substructure are arranged as described and thermally processed so that the preforms bond together at their interfaces with each other and also bond to the prefabricated substructure components.

With the components of the inlet case having now been described, the overall construction may be better appreciated. The outer preforms 24, 26, spar 44, and wings 50, 52, 54, 56 interface with the substructure to form a joint of superior strength. The joint resists any tendency of the strut 18 to separate from the substructure and/or wall 12 due to operational forces. The structural superiority arises in part from the wings. This is because the area of contact between the wings and the substructure augments the contact area between the spar and the substructure. As a result, the ability of the spar/wing combination to withstand shearing forces is greater than that of the spar alone. The structural superiority also arises from the cover layer 62, which helps resist any tendency of the lateral legs 40 of outer preforms 24, 26 to peel off the insert 68. This is a noteworthy feature in applications where the strut is axially foreshortened, resulting in less surface area, and therefore less intrinsic peel resistance, between the lateral legs and the inserts. The wings 50, 52, also contribute to the structural superiority of the joint, especially when tensile loads attempt to pull the strut 18 radially away from the wall 12. Because the wings 50, 52, 54, 56 are mechanically retained by the cover layer 62, the fibers 58 in the wings must be mechanically fractured in order for the strut 18 to pull out of the radially inner wall 12. Since the tensile strength of the composite fibers can be considerably greater than the shear strength of the bond between the preforms, the strength of the joint is improved by the presence of the wings. The improved shear resistance, peel resistance and mechanical retention are especially useful in applications where a designer finds it necessary or desirable to employ a relatively small structural strut.

Although this invention has been shown and described with reference to a specific embodiment thereof, it will be understood by those skilled in the art that various changes in form and detail may be made without departing from the invention as set forth in the accompanying claims. For example, the preform arrangement may be augmented with additional preforms and the substructure may take other forms depending on the application of interest. And although the invention has been described in the context of an annular fan inlet case for a turbine engine, it is clear that the construction can be used in other types of ducts and in other applications not necessarily involving ducts.

We claim:

1. A joint comprising:
   an outer preform having legs extending longitudinally and laterally from a fold in the outer preform,
   an inner preform projecting longitudinally past the fold to define a spar, the spar including a wing angularly offset from the spar; and
   a substructure cooperating with the spar and wing to resist separation of spar and wing from the substructure.

2. The joint of claim 1 wherein:
   the substructure includes a forward ring, an aft ring and an insert;
   the spar includes a pair of forward wings extending in laterally opposite directions from each other and a pair of aft wings also extending in laterally opposite directions from each other; and
   the forward wings nest between the forward ring and the insert and the aft wings nest between the aft ring and the insert.

3. The joint of claim 1 wherein a cover preform covers the laterally extending leg of the outer preform.

4. The joint of claim 1 comprising an intermediate preform residing between the inner and outer preforms and projecting longitudinally past the fold to cooperate with the inner preform in defining the spar.

5. The joint of claim 4 wherein the projecting portion of the intermediate preform is devoid of any wings.

6. The joint claim 1 wherein the wing is angularly offset from the spar by about 90 degrees.

7. The joint of claim 1 wherein the spar and wing meet at a crease, and the inner preform comprises a fabric with fibers oriented off-angle relative to the crease.

8. A duct comprising a longitudinally extending strut comprised of an inner preform and an outer preform, the outer preform having legs extending longitudinally and laterally from a fold in the outer preform so that the laterally extending legs form at least a portion of a duct wall, the inner preform projecting longitudinally past the fold to define a spar, the spar including a wing angularly offset from the spar.

9. The duct of claim 8 comprising a substructure cooperating with the spar and wing to resist separation of the strut from the substructure.

10. The duct of claim 9 wherein:
    the substructure includes a forward ring, an aft ring and an insert;
    the spar includes a pair of forward wings extending in laterally opposite directions from each other and a pair of aft wings also extending in laterally opposite directions from each other; and
    the forward wings nest between the forward ring and the insert and the aft wings nest between the aft ring and the insert.

11. The duct of claim 8 wherein a cover preform covers the laterally extending leg of the outer preform.

12. The duct of claim 8 comprising an intermediate preform residing between the inner and outer preforms and projecting longitudinally past the fold to cooperate with the inner preform in defining the spar.

13. The duct of claim 12 wherein the projecting portion of the intermediate preform is devoid of any wings.

14. The duct of claim 8 wherein the fold extends in a substantially axial direction.

15. The duct of claim 8 wherein the wing is angularly offset from the spar by about 90 degrees.

16. The duct of claim 8 wherein the duct circumscribes a centerline, the longitudinal direction is radial and the lateral direction is circumferential.

17. The duct of claim 8 wherein the spar and wing meet at a crease, and the inner preform comprises a fabric with fibers oriented off-angle relative to the crease.

18. The duct of claim 8 wherein the wing extends laterally toward a companion wing associated with a neighboring strut.

19. The duct of claim 18 wherein the wing abuts the companion wing.

20. The duct of claim 19 wherein the wing overlaps the companion wing.

21. An inlet case, comprising:

radially extending struts each comprised of at least an inner preform and an outer preform, the outer preform of each strut having legs extending radially and circumferentially from a fold in the outer preform to define, at least in part, a case wall, the inner preform projecting radially past the fold to define a spar, the spar including a pair of circumferentially extending forward wings and a pair of circumferentially extending aft wings;

inserts located circumferentially between neighboring spars, and axially between a forward wing and a counterpart aft wing;

a forward ring axially forward of the forward wings;

an aft ring axially aft of the aft wings; and a cover covering the circumferentially extending leg of the outer preform and cooperating therewith in defining the case wall, the cover also extending over a face of the forward ring.

\* \* \* \* \*